United States Patent
Meusel et al.

(10) Patent No.: US 10,915,391 B2
(45) Date of Patent: *Feb. 9, 2021

(54) SENSOR DATA ANOMALY DETECTION

(71) Applicant: SAP SE, Walldorf (DE)

(72) Inventors: Robert Meusel, Mannheim (DE); Jaakob Kind, Heidelberg (DE); Atreju Florian Tauschinsky, Walldorf (DE); Janick Frasch, Mannheim (DE); Minji Lee, Heidelberg (DE); Michael Otto, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,186

(22) Filed: Jun. 27, 2019

(65) Prior Publication Data

US 2019/0317848 A1    Oct. 17, 2019

Related U.S. Application Data

(63) Continuation of application No. 15/463,601, filed on Mar. 20, 2017, now Pat. No. 10,379,933.

(60) Provisional application No. 62/459,197, filed on Feb. 15, 2017.

(51) Int. Cl.
| | | |
|---|---|---|
| *G06F 11/07* | (2006.01) | |
| *G06F 16/2458* | (2019.01) | |
| *G05B 23/02* | (2006.01) | |
| *G06N 7/00* | (2006.01) | |

(52) U.S. Cl.
CPC .......... *G06F 11/079* (2013.01); *G05B 23/024* (2013.01); *G06F 11/0721* (2013.01); *G06F 16/2477* (2019.01); *G06N 7/005* (2013.01)

(58) Field of Classification Search
CPC ............................... G06F 11/07; G06F 11/079
USPC .......................................................... 714/37
See application file for complete search history.

(56) References Cited

U.S. PATENT DOCUMENTS

| | | | | |
|---|---|---|---|---|
| 2007/0011661 A1* | 1/2007 | Itoh | .......................... | G06F 9/485 717/127 |
| 2008/0086283 A1* | 4/2008 | Yuan | ..................... | G05B 23/024 702/181 |
| 2008/0086437 A1* | 4/2008 | Yuan | ................... | G06F 11/0706 706/16 |
| 2012/0041575 A1* | 2/2012 | Maeda | ................. | G05B 23/024 700/80 |

(Continued)

*Primary Examiner* — Kamini B Patel
(74) *Attorney, Agent, or Firm* — Buckley, Maschoff & Talwalkar LLC

(57) ABSTRACT

Some embodiments include reception of a time-series of a respective data value generated by each of a plurality of sensors, calculation of a regression associated with a first sensor of the plurality of sensors based on the received plurality of time-series, the regression being a function of the respective data values of the others of the plurality of data sources, reception of respective data values associated with a time from and generated by each the plurality of respective sensors, determination of a predicted value associated with the time for the first sensor based on the regression associated with the first sensor and on the respective data values associated with the time, comparison of the predicted value with the received value associated with the time and generated by the first sensor, and determination of a value indicating a likelihood of an anomaly based on the comparison.

18 Claims, 6 Drawing Sheets

(56) References Cited

U.S. PATENT DOCUMENTS

| | | | |
|---|---|---|---|
| 2015/0023553 A1* | 1/2015 | Rosario | G06K 9/00624 |
| | | | 382/103 |
| 2015/0128265 A1* | 5/2015 | Jover | H04W 12/12 |
| | | | 726/23 |
| 2016/0342903 A1* | 11/2016 | Shumpert | G06F 11/0721 |
| 2017/0155570 A1* | 6/2017 | Maheshwari | H04L 43/50 |
| 2020/0098238 A1* | 3/2020 | Skaaksrud | B64D 25/00 |

* cited by examiner

Model

| | |
|---|---|
| model1 | *Name: _____ |
| Created by: [Unknown_US... | Description: _____ |
| Created at: 2017-02-08 13:25 | |
| | *Training Table: _____ |
| model2 | *Scoring Table: _____ |
| Created by: [Unknown_US... | *Property Set Typ _____ |
| Created at: 2017-02-08 13:23 | |
| | Created By: _____ |
| SOME_MODEL_NAME1 | Created On: _____ |
| 486560264508 | *Algorithm: com.spp.pdms.database  MAR |
| Created by: [Unknown_US... | *Learner Type: UNSUPERVISED |
| Created at: 2017-02-08 13:22 | |

Model-Specific Parameters

Input variables

☐ Indep. Variables

| | | |
|---|---|---|
| ☐ | Model-specific params | Values |
| ☐ | target.columns | Multiple values can be separated by |
| ☐ | window.size | 10 |
| ☐ | weight.by.uncer | TRUE |
| ☐ | normaliser.type | quintile |
| ☐ | normaliser.val | 0.99 |

*FIG. 5*

SENSOR DATA ANOMALY DETECTION

CROSS-REFERENCE TO RELATED APPLICATION

This is a continuation of co-pending prior U.S. patent application Ser. No. 15/463,601, filed on Mar. 20, 2017, entitled "SENSOR DATA ANOMLAY DETECTION", and claims benefit to and priority of, U.S. Provisional Patent Application Ser. No. 62/459,197, filed on Feb. 15, 2017, the contents of which are hereby incorporated herein by reference in its entirety for all purposes.

BACKGROUND

The field of predictive maintenance seeks to detect impending failures of components or processes. The detection is typically performed by first identifying of patterns in historical sensor data which preceded past failures, and then determining whether current sensor data conforms to the patterns. These techniques are unsuitable in cases where such historical sensor data, or training data, is not available in sufficient quantities.

BRIEF DESCRIPTION OF THE DRAWINGS

FIG. 5 is an outward view of a user interface for setting parameters according to some embodiments.

DETAILED DESCRIPTION

The following description is provided to enable any person in the art to make and use the described embodiments. Various modifications, however, will remain readily apparent to those in the art.

Generally, some embodiments provide anomaly detection by comparing current sensor values with their expected values. The expected values are determined based on regressions which are calculated based on previous sensor values. Some embodiments may therefore provide more efficient forecasting, flexibility in predictions, and/or improved integration with other analytics and planning workflows.

Figure 1:
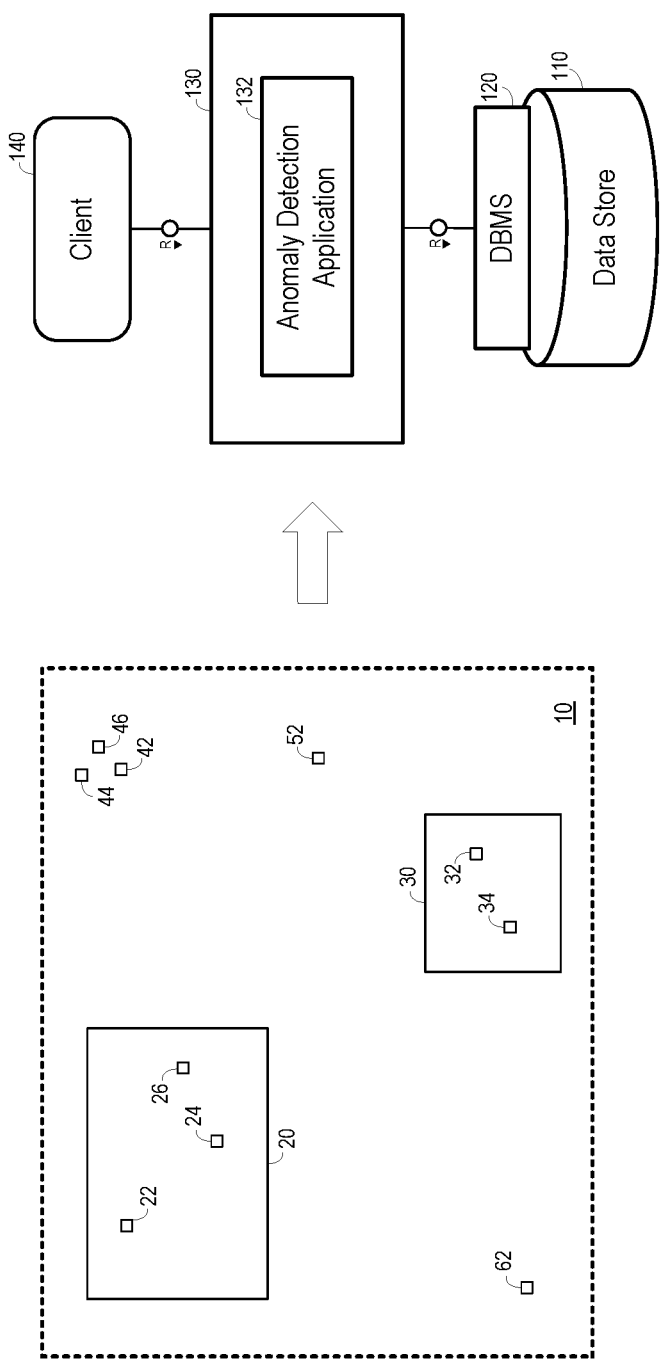
FIG. 1 is a block diagram of a system architecture according to some embodiments.

FIG. 1 is a block diagram of a system according to some embodiments. Embodiments are not limited to the FIG. 1 system.

FIG. 1 shows plant 10 and computing system 100. Plant 10 may comprise any industrial, engineering or other physical complex according to some embodiments, but embodiments are not limited thereto. Plant 10 may be distributed over two or more geographic areas.

Plant 10 includes components 20 and 30, each of which may comprise machinery (e.g., a turbine engine) or a component thereof (e.g., a turbine blade). Disposed upon or adjacent to components 20 and 30 are respective sensors 22, 24, 26, and 32, 34. Further disposed within plant 10 are sensors 42, 44, 46, 52 and 62, each of which may or may not be associated with a particular component. For example, one of sensors 42, 44, 46, 52 and 62 may comprise an ambient temperature sensor. Embodiments may employ any type of sensor for sensing any physical characteristic, and from which a value of the physical characteristic may be received.

Each sensor of plant 10 may generate data values. The data values may be generated periodically, with the generation period differing among one or more sensors. The data values may also or alternatively be generated by one or more sensors in response to a detected event, such as detection of a generated value exceeding a threshold.

The generated values are transmitted to system 100 using any suitable transmission system and protocol. For example, the values may be transmitted in batch form in real-time or periodically, and each transmission need not include values generated from each sensor. In some embodiments, the values are associated with timestamps indicating the time at which they were generated. Accordingly, the values generated by a sensor may comprise time-series data. Embodiments are not limited to reception of sensor data from a single plant or location.

Architecture 100 includes data store 110, database management system (DBMS) 120, server 130, and clients 140. Server 130 may execute anomaly detection application 132 to receive sensor data and determine possible anomalies based thereon according to some embodiments. Server 130 may also receive requests from client 140 and provide data thereto in response, for example via user interfaces. Client 140 may also provide, via such user interfaces, configuration data to server 130 for use in execution of anomaly detection application 132.

According to some embodiments, client 140 executes a Web browser to present a user interface to a user on a display of client 140. The user enters a query into the user interface, and client 140 passes a request based on the query to server 130. Server 130 generates an SQL script based on the request, and forwards the SQL script to DBMS 120. DBMS 120 executes the SQL script to return a result set to server 130 based on data of data store 110, and the client 140 generates and displays a report/visualization based on the result set.

Data store 110 may comprise any data sources which are or become known, including but not limited to database views, spreadsheets, relational databases and/or OnLine Analytical Processing cubes. Data store 110 may also comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

System 100 may be located on-premise according to some embodiments. According to other embodiments, server 130, DBMS 120 and data store 110 are located off-site (e.g., in the Cloud) and are accessed via client 140 over Web protocols.

Figure 2:
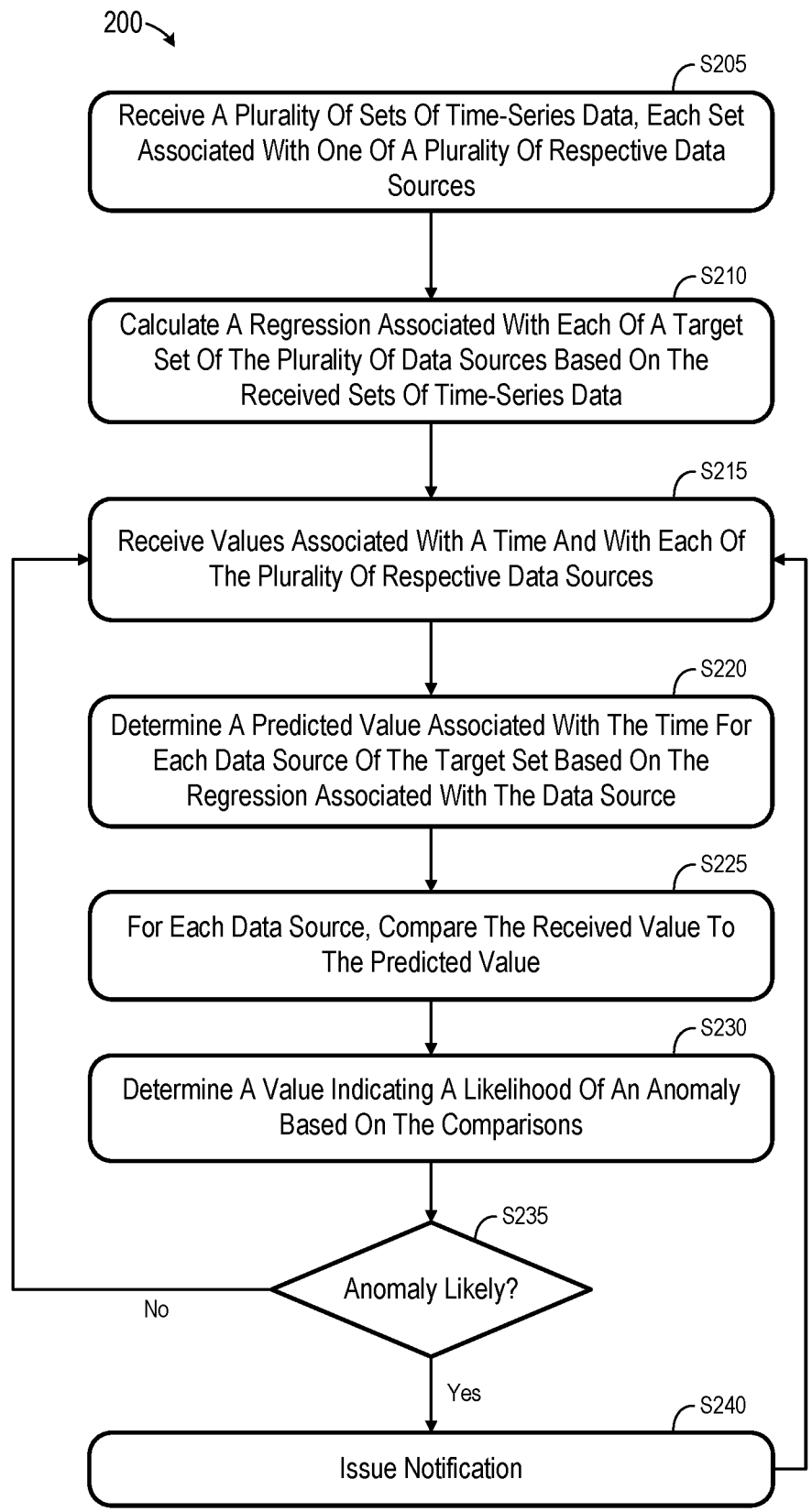
FIG. 2 is a flow diagram of a process according to some embodiments.

FIG. 2 comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S205, a plurality of sets of time-series data are received. According to one example, the plurality of data sources comprise a plurality of sensors such as the above-described sensors of FIG. 1. Each set of time-series data is associated with one of a plurality of respective data sources. Each set of time-series data need not be received simultaneously, and each set need not include data associated with the same times. The plurality of sets of time-series data may be received at S205 from a database table storing previously-received sensor data.

At S210, a regression is calculated for each of a target set (i.e., a subset) of the plurality of data sources, based on the received sets of time-series data. The regression may be linear, polynomial, etc., and may be calculated using any systems that are or become known.

Figure 3:
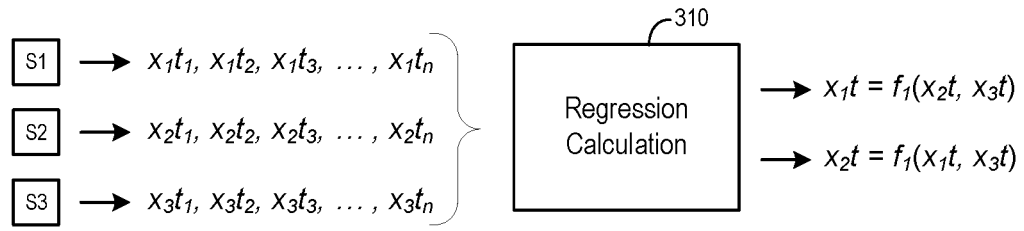
FIG. 3 illustrates regression calculation according to some embodiments.

FIG. 3 illustrates an example of S210 according to some embodiments. FIG. 3 shows sensors S1, S2 and S3 and their associated time-series data which is received at S210. For example, the time-series data $x_1t_1$, $x_1t_2$, $x_1t_3$, ..., $x_1t_n$ associated with sensor S1 includes values $x_1$ generated by sensor S1 at various times t. Regression calculation module 310 calculates regressions for selected ones of the sensor values based on each of the illustrated time-series according to some embodiments. In the present example, a regression is calculated for value $x_1$ of sensor S1 and for value $x_2$ of sensor S2, but not for value $x_3$ of sensor S3. As illustrated, a regression $f_1$ is calculated for sensor S1 and is a function of the values $x_2$ and $x_3$ generated by sensors S2 and S3, respectively. Similarly, a regression $f_2$ is calculated for sensor S2 and is a function of the values $x_1$ and $x_3$ generated by sensors S1 and S3. The regressions may be stored in data store 110 and may also be periodically updated based on subsequently-received time-series data.

At S215, values associated with a particular time and with each of the plurality of data sources are received. Such a set of values may be referred to as an observation, which consists of the values generated by one or more sensors at a given time.

Figure 4:
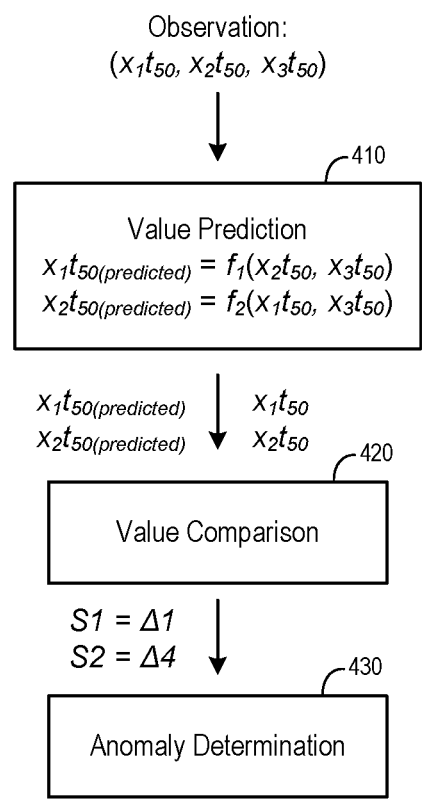
FIG. 4 illustrates anomaly determination according to some embodiments.

A predicted value is then determined for each data source of the target set (i.e., those data sources for which a regression was calculated at S210) based on the observation time t. Continuing with the present example, FIG. 4 shows observation values $x_1t_{50}$, $x_2t_{50}$, and $x_3t_{50}$ corresponding to time $t_{50}$ and which were received at S215. Each calculated regression is used by value prediction module 410 to predict a value for the associated sensor based on the observation time t. For example, $x_1t_{50(predicted)}=f_1(x_2t_{50}, x_3t_{50})$, and $x_2t_{50(predicted)}=f_2(x_1t_{50}, x_3t_{50})$. The functions $f_1$ and $f_2$ may be functions of one or more values at any prior times t.

More specifically, the above assumptions may be formalized as: $X_t'=f(X_{t-1}, X_{t-2}, \ldots X_{t-m})$, where $X_t'$ is the vector of size n containing all predicted sensor values for time t and $X_t'$ is the vector containing all n observed sensor readings for time t. The following is a special case of an affine transformation $f$:

$X_t'=a_1*Xt-1+a_2*Xt-2+ \ldots +a_m*Xt-m+a_0$, where $a_1$ is element of $R^n$ and $a_0$ is the support vector. Using more general functions $h_1, \ldots, h_m$, and g:

$f(X_{t-1}, X_{t-2}, \ldots X_{t-m})=g(h_1(X_{t-1}), h_2(X_{t-2}), \ldots h_m(X_{t-m}))$, which captures nonlinear intersensor dependencies and autoregression structurally separated.

For each data source, the corresponding received value is compared to the predicted value at S225. In this regard, FIG. 4 also shows passing of the predicted values (e.g., $x_1t_{50(predicted)}$ and $x_2t_{50(predicted)}$) and their corresponding actually-observed values (e.g., $x_1t_{50}$, $x_2t_{50}$) to value comparison module 420 to conduct such a comparison. In one non-exhaustive example, $x_1t_{50}=10$ and $x_1t_{50(predicted)}=11$, while $x_2t_{50}=20$ and $x_2t_{50(predicted)}=24$. Accordingly, in some embodiments, the comparison at S225 yields: S1=$\Delta1$; S2=$\Delta4$. The results of the comparison may be quantified in any suitable manner that is or becomes known.

Next, at S230, a value is determined, based on the comparisons of S225, which indicates a likelihood of the existence of an anomaly. An anomaly may consist of any functioning of any component or process which is outside a normal and/or acceptable range, or which indicates future functioning outside a normal and/or acceptable range.

According to some embodiments, the value is determined at S230 by aggregating root mean squared error of the differences between the predicted and observed values. Using the values of the current example, the value may be calculated as $[(1)^2/2+(4)^2/2]^{1/2}=(17/2)^{1/2}$. Embodiments may employ any other algorithm to determine a value representing multiple error values. In one non-exhaustive example, the individual differences may be combined based on weightings which represent the predictive accuracy of the associated regressions (e.g., an arbitrary normalized quality measurement (e.g., $R^2$)).

Based on the value determined at S230, it is determined at S235 whether an anomaly is likely. The determination at S235 may comprise determining whether the value exceeds a threshold value. The threshold value may depend upon the target set of data sources for which predicted values were determined.

Flow may return to S215 and continue as described above if it is determined at S235 that an anomaly is not likely. If the determination at S235 is positive, flow proceeds to S240 to issue a notification of the likely anomaly. The notification may comprise any one or more suitable transmissions, possibly of varying type (e.g., e-mail, text, user interface pop-up window), to one or more predetermined personnel.

According to some embodiments, the type, content and recipients of the notification may depend upon the target data sources, the extent to which the determined value exceeds the threshold, etc. Flow returns to S215 from S240.

Some embodiments of process 200 assume that a value generated by a sensor depends on the values generated by one or more other sensors. Examples of such related values include the rotation speed of a turbine and the temperature of the turbine's bearings or the turbine's produced throughput. Also, it is assumed that a value of a sensor for a given time t depends on the values of one or more sensors (not necessarily other sensors) at time t−x (x>0). An example of such a value is an ambient temperature over the course of a day.

Some embodiments implement user-selectable and/or default configuration parameters. Examples of configuration parameters include window.size, target.columns, weight.by.uncertainty, normalizer.type and normalizer.value. These configuration parameters may influence operation of certain aspects of process 200 as will be described below.

The window.size parameter may indicate the number of most-recent observations per time-series which are taken into account in calculating a regression. A possible default window.size is 10 in some embodiments. Windowing may be used where each row of stored sensor data contains the observations from one particular time. The use of time-series having equidistant times may provide more suitable outcomes.

The target.columns parameter indicates the columns (i.e., the target set of data sources) for which the regressions should be calculated. A user may specify at least one target column based on the user's knowledge of the data sources, their relationship, and/or their relevance to detection of an anomaly. If no target columns are specified, regressions are calculated for all columns.

In case it is determined that a regression for one particular target value does not produce reliable predicted values, some embodiments may discount the influence of this particular deviation on the likelihood determination with respect to the deviation produced by a more accurate regression. The weight.by.uncertainty Boolean parameter determines whether such discounting occurs.

The normaliser.type parameter specifies the type of normaliser which should be applied to the scores calculated by the algorithm. In some embodiments, allowed values are quantile, threshold and none. The quantile value causes internal calculation of an effective threshold value based on the training data, while the threshold value results in the use of a given value. In this regard, normaliser.value indicates the value which is used for the normalisation. For quantile normalisers, valid values may be between 0 and 1 and, for threshold normalisers, values larger than 0 are valid.

FIG. 5 illustrates interface 500 which may be presented by client 140 according to some embodiments. Interface 500 provides fields to specify values of the above-described parameters. A user may input values into the fields, which are transmitted to server 130 and used by application 135 to control execution of process 200 according to some embodiments.

Figure 6:
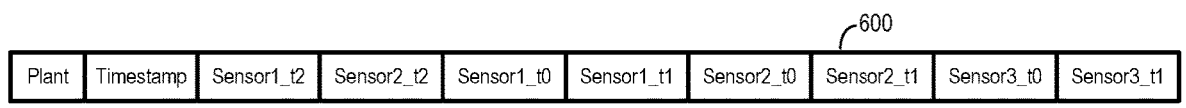
FIG. 6 is a tabular representation of a portion of a time series data according to some embodiments.

According to some embodiments, the received time-series data may exhibit different formats. FIG. 6 illustrates columns of table 600 in which each row contains the target values as well as all values which should be used to predict the target values. For example, the third and fourth columns include data from Sensor1 and Sensor2 for the current time $t_2$ (i.e., the time indicated by the Timestamp column). The remaining columns include the values of sensor readings from sensors 1-3 for the two prior timestamps (i.e., $t_1$, $t_0$).

To use the received data of table 600, the window.size parameter is set to 0 and the target.columns parameter values are Sensor1_T2 and Sensor2_T2. Two regressions would then be calculated at S210, one for each target.column and based on the remaining columns (excluding the Plant and Timestamp columns). This scenario might be useful in a case that different window sizes should be applied to different sensors or a predetermined aggregation for timestamps is needed.

Figure 7:
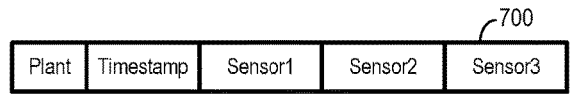
FIG. 7 is a tabular representation of a portion of a time series data according to some embodiments.

According to other embodiments, each row of received data only contains sensor data for a specific time t. FIG. 7 illustrates columns 700 of such a table. If no target data sources are set using the target.columns parameter, regressions will be calculated for each column of sensor data. The window.size parameter may be set to a value larger than 0. Some embodiments may transform an input table conforming to column 700 into a table conforming to column 600 prior to execution of S210.

According to some embodiments, a warning is generated if the received data includes too few input rows. Such a warning may indicate that the likelihood value determined at S230 might be unreliable.

Figure 8:
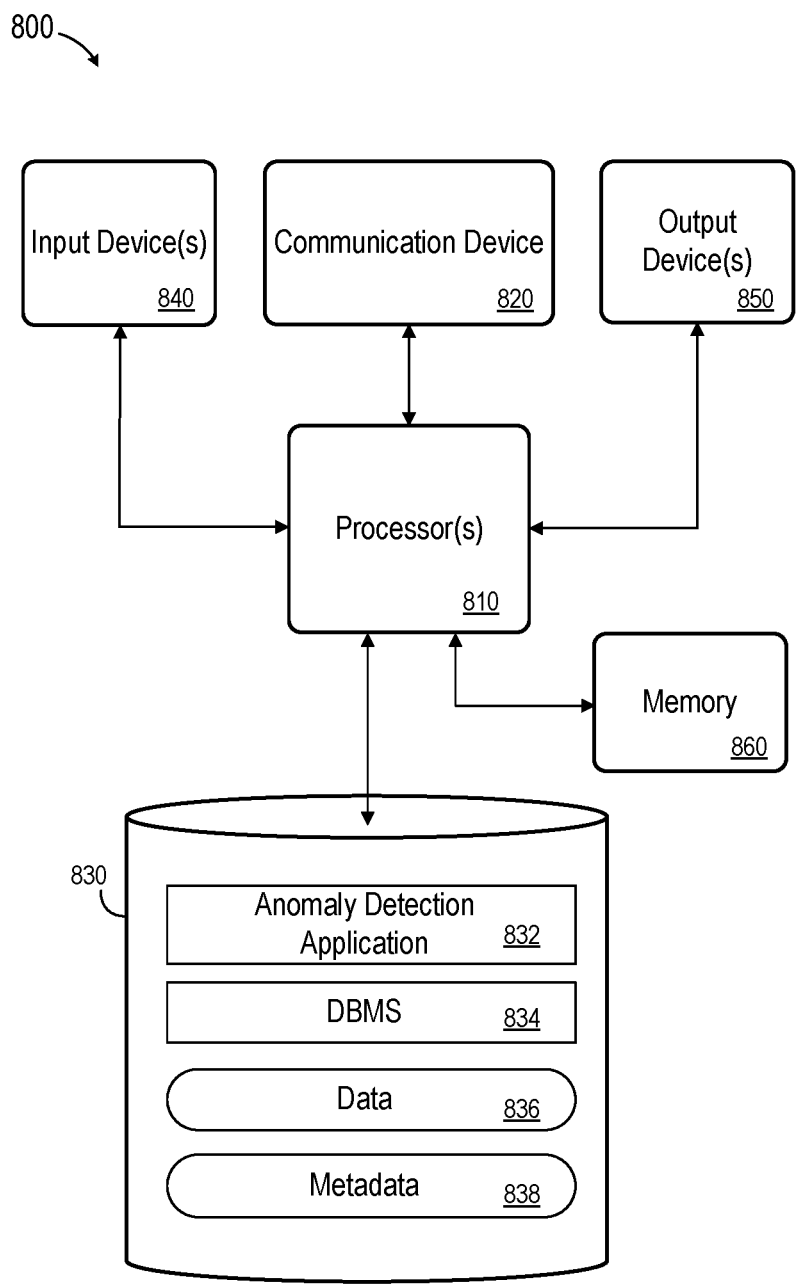
FIG. 8 is a block diagram of an apparatus according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of server 130, DBMS 120 and data store 110 of FIG. 1 in some embodiments. Apparatus 800 may include other unshown elements according to some embodiments.

Apparatus 800 includes processor(s) 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory.

Anomaly detection application 832 and DBMS 834 may comprise program code executed by processor 810 to cause apparatus 800 to perform any one or more of the processes described herein. Embodiments are not limited to execution of these processes by a single apparatus.

Data 836 and metadata 838 (either cached or a full database) may be stored in volatile memory such as memory 860. Metadata 838 may include information regarding the structure of the data stored within data 836. Data storage device 830 may also store data and other program code for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a plurality of data sources, each of the plurality of data sources to generate a time-series of a respective data value;
   a server device to:
      receive the plurality of time-series of respective data values;
      receive one or more configuration parameters;
      calculate a regression associated with a first data source of the plurality of data sources based on the received plurality of time-series and the received one or more configuration parameters;
      receive respective data values associated with a time from and generated by each of the plurality of respective data sources;
      determine a predicted value associated with the time for the first data source based on the regression associated with the first data source, received one or more configuration parameters and on the respective data values associated with the time;
      compare the predicted value with the received value associated with the time and generated by the first data source; and
      determine a value indicating a likelihood of an anomaly based on the comparison.

2. The system of claim 1, wherein the one or more configuration parameters are window size, target column, weight by uncertainty, normalizer type and normalizer value.

3. The system of claim 2, wherein the window size parameter indicates the number of most-recent observations per time-series.

4. The system of claim 3, wherein a first window size parameter is applied to a first sensor and a second window size parameter is applied to a second sensor.

5. The system of claim 4, wherein:
   the first window size parameter is different from the second window size parameter; and
   the first sensor is different from the second sensor.

6. The system of claim 2, wherein the target column parameter indicates at least one column for which the regression is to be calculated.

7. The system of claim 6, wherein the at least one column represents a target set of data sources.

8. The system of claim 6, wherein the at least one column is selected based on at least one of a relationship of the data sources, and a relevance of the data sources to detection of the anomaly.

9. The system of claim 2, wherein the normalizer type parameter specifies a type of normalizer to apply to the value indicating the likelihood of the anomaly.

10. The system of claim 9, wherein the normalizer value indicates a value which is used for the normalization.

11. The system of claim 10, wherein the normalizer value is one quantile, threshold and none.

12. The system of claim 11, wherein the quantile normalizer value causes an internal calculation of an effective threshold value based on training data.

13. A computer-implemented method comprising:
   receiving a time-series of a respective data value generated by each of a plurality of sensors;
   receiving one or more configuration parameters;
   calculating a regression associated with a first sensor of the plurality of sensors based on the received plurality of time-series and the received one or more configuration parameters;
   receiving respective data values associated with a time from and generated by each the plurality of respective sensors;
   determining a predicted value associated with the time for the first sensor based on the regression associated with the first sensor, received one or more configuration parameters and on the respective data values associated with the time;
   comparing the predicted value with the received value associated with the time and generated by the first sensor; and
   determining a value indicating a likelihood of an anomaly based on the comparison.

14. The method of claim 13, wherein the one or more configuration parameters are window size, target column, weight by uncertainty, normalizer type and normalizer value.

15. The method of claim 14, wherein the window size parameter indicates the number of most-recent observations per time-series.

16. The method of claim 15, wherein a first window size parameter is applied to a first sensor and a second window size parameter is applied to a second sensor, and wherein the first window size parameter is different from the second window size parameter and the first sensor is different from the second sensor.

17. The method of claim 14, wherein the target column parameter indicates at least one column for which the regression is to be calculated; and
   wherein the at least one column represents a target set of data sources.

18. The method of claim 14, wherein the normalizer type parameter specifies a type of normalizer to apply to the value indicating the likelihood of the anomaly; and
   the normalizer value indicates a value which is used for the normalization.

* * * * *